United States Patent Office 2,809,943
Patented Oct. 15, 1957

2,809,943

WEIGHTED ION EXCHANGE RESIN GRANULES AND METHOD OF MAKING SAME

David J. Pye and Theo John West, Concord, Paul M. Craven, Walnut Creek, and James A. Patterson, Concord, Calif., assignors to The Dow Chemical Company, Midland, Mich., a corporation of Delaware No Drawing. Application September 11, 1952, Serial No. 309,136

18 Claims. (Cl. 260—2.1)

This invention concerns a method of making weighted ion exchange granules, having average densities considerably higher than those of the ion exchange resins alone, and the weighted granules obtainable by the method. It pertains especially to weighted granules of ion exchange resins derived from copolymers of monovinyl aromatic compounds and polyvinyl aromatic compounds, which weighted granules are in the form of rounded, e. g. spherical or oval-shaped, beads.

It is known to prepare ion exchange resins by polymerizing mixtures of a major amount by weight of one or more monovinyl aromatic compounds and a minor amount of one or more polyvinyl aromatic hydrocarbons to obtain solid polymers which are insoluble in benzene and other usual organic solvents and to chemically treat the polymers so as to introduce sulfonate groups or radicals containing basic nitrogen atoms into the molecule and thus obtain cation exchange resins or anion exchange resins, respectively. U. S. Patents Nos. 2,366,007; 2,366,008; 2,591,573 and 2,591,574 describe in detail procedures for making such cation and anion exchange resins. It is also known that the copolymerization reaction to form the resin may be carried out in mass, i. e. in the absence of a liquid medium, to obtain an extensive body of copolymer which may be comminuted and converted to the ion exchange resins, but that the polymerization is advantageously carried out while the mixture of monomers is suspended as droplets in a non-solvent liquid, such as water, so as to obtain the copolymer directly as small rounded granules, or beads, that can be chemically treated to obtain ion exchange resins of a similar physical form. It has further been proposed that inert materials such as diatomaceous earth, alundum, or coke, etc., be admixed with the liquid monomers, as carriers for the latter, and the monomers be polymerized to form a polymer coating on the surface of the carrier material. It has still further been taught that an emulsion type of polymerization is suited for thus coating the carrier materials and that such practice of coating a carrier material with the polymer increases the effective surface of the polymer. As indicated above, the copolymer beads used in making ion exchange resin beads of the usual sizes, e. g. of from 20 to 60 Tyler screen mesh size, are made by polymerizing a mixture of the monomers while suspended as droplets in a non-solvent liquid, and not by an emulsion type of polymerization.

Although finely divided inert solid materials can be admixed with the aforementioned monomers, e. g. styrene and divinylbenzene, and the latter be polymerized to form polymer bodies having the inert solids embedded therein, it is difficult to maintain the inert solids uniformly admixed with the monomers during polymerization of the latter while suspended as droplets in a non-solvent liquid. Most inert solids, e. g. diatomaceous earth, coke, or sand, tend to separate from the monomers during such suspension polymerization. The difficulty of maintaining a uniform admixture of the monomers and the particles of inert solid material becomes greater with increase in the difference between the density of the monomeric material and the density of the inert solids. For this reason the known methods of incorporating inert solids, e. g. fillers, in resinous polymeric materials are not suitable for the production of uniformly weighted beads, or rounded granules, of the aforementioned copolymers of monovinyl- and polyvinyl-aromatic compounds having particles of considerably more dense solid materials embedded therein.

The low densities, e. g. in the range of from 1.1 to 1.4, of the anion and cation exchange resins prepared from copolymers of monovinyl- and polyvinyl-aromatic hydrocarbons, impose a limitation on the flow rates that can be used when employing the resins in certain ion exchange operations. For instance, in usual water-softening or demineralization processes the rate of up-flow of water through beds of such resins during the conventional backwashing operations must be low, e. g. not more than about 0.07 foot per minute, in order to avoid sweeping the resins from the ion exchange chamber, but such operation would be more effective if higher rates of water-flow could be used. More important, in ion exchange processes for the recovery, in more concentrated form, of ions such as magnesium or nitrate ions from dilute solutions thereof, the dilute solution is contacted with an ion exchange resin which chemically absorbs the desired ions and the latter are then displaced from the ion exchange resin by treating it with a liquid regenerating agent so as to form a solution of the ions which is of higher concentration than the starting solution. For good efficiency, it is important that the regenerating operation of such process be carried out in a continuous manner with feed of the ion exchange resin granules to the top of a regenerating column, and feed of a regenerating liquor to the bottom of the column, so that the granules are caused to descend through the up-flowing liquid. However, the low rate of flow which is required to avoid entrainment of the ion exchange resin granules in the stream limits the rate of production. Attempts to obtain increased rates of production by use of regenerating columns of quite large diameter, e. g. 1 foot diameter or larger, have been unsatisfactory, since an increase over the usual column diameters of about 4 inches or less results in channeling of the materials and a decrease in efficiency of the process as a whole.

It is an object of this invention to provide weighted ion exchange resin granules, having particles of a solid material possessing a density of at least 2.5 and preferably 3 or higher embedded therein, which granules are of a substantially uniform apparent density considerably greater than the density of the copolymer alone, and which ion exchange resin granules possess a desirable combination of physical, mechanical and chemical properties rendering them well suited for use in ion exchange processes. The density of the weighted ion exchange resins permits use of greater flow rates in ion exchange processes employing the same than can satisfactorily be used when employing unweighted granules of the ion exchange resins in place of the weighted resins.

A particular object of the invention is to provide weighted beads, or rounded granules, of copolymers of monovinyl- and polyvinyl-aromatic hydrocarbons, which beads are of from 10 to 100 mesh size, according to the Tyler screen scale, are of substantially uniform density, and have smaller particles of solid material, having a density of at least 2.5 and preferably 3 or higher, embedded therein. Another object is to provide a method of incorporating particles of solid materials having densities of at least 2.5, and preferably 3 or higher, in beads of copolymers of monovinyl- and polyvinyl-aromatic hydrocarbons during preparation of the copolymer beads by polymerization of a mixture of the corresponding monomers while suspended as droplets in a non-solvent liquid. A further object is to provide a method of making the aforementioned ion exchange resins in the form of weighted beads, which beads are of from 10 to 100 mesh size, are of substantially uniform density, and have particles of a solid material, having a density of at least 2.5, and preferably 3 or higher, embedded therein. Other objects will be evident from the following description of the invention.

For satisfactory use in ion exchange processes involving up-flow of a liquid through a body of the weighted ion exchange resin granules, it is important that the granules be of close to the same density and it is desirable that they be within a narrow range of mesh sizes. Since the weighted ion exchange resin granules are prepared from weighted granules of copolymers of monovinyl- and polyvinyl-aromatic hydrocarbons, it is important that the weighted copolymer granules be of close to the same density and it is desirable that they fall within a narrow range of mesh sizes. However, attempts to prepare weighted copolymer beads by admixing the monovinyl- and polyvinyl-aromatic hydrocarbons with more dense finely divided solids and polymerizing the mixture while suspended as droplets in a non-solvent liquid, in accordance with the practice employed in manufacture of beads of the copolymers alone, failed to give satisfactory products. Instead, the liquid monomers and the finely divided weighting materials separated from one another and the beads which were obtained consisted for the most part of the copolymers. In some instances certain of the beads contained weighting material, but the distribution of the same in the beads was far from uniform and a major amount of the weighting material was not retained in the beads. Attempts to overcome this difficulty by changes in the viscosity of the non-solvent liquid polymerization medium and by changes in the rate of stirring during the polymerization failed.

We found that a pretreatment of the finely divided weighting materials with hydrophobing agents (i. e. agents which, when applied as thin films not visible to the eye on cotton fabrics or other water-wettable solid materials, render the treated material repellent to water) reduces greatly the tendency of the dense weighting material to separate from the less dense mixture of liquid monovinyl- and polyvinyl-aromatic hydrocarbons during a suspension polymerization of the hydrocarbons and permits production of copolymer beads having the weighting material embedded therein. The weighted copolymer beads thus produced are usually, but not always, of close to the same density throughout a body of the beads.

We further found that for satisfactory incorporation in the copolymer beads it is important that the weighting material be in the form of particles of 80 mesh size or smaller, preferably of from 100 to 350 Tyler mesh size, since, even though pretreated with a hydrophobing agent, larger particles of the weighting agent tend to separate from the monomers during suspension polymerization of the latter.

We also found that the tendency for the finely divided weighting agent to separate from the liquid monomers during the suspension polymerization varies with change in the viscosity of the non-solvent liquid used as a polymerization medium and that non-solvent liquids having viscosities of from 20 to 250 centipoises at 80° C., i. e. a usual polymerization temperature, are suitable for use in making the weighted copolymers. The optimum viscosity value for the medium varies somewhat with change in the kind of weighting agent employed, but is within the general range just stated.

We have further observed that the tendency toward separation of the finely divided weighting material from the monomers can be varied by a change in the rate of stirring during the suspension polymerization, but that the rate or mode of agitating the mixture may be varied and still obtain a satisfactory result. In general, the polymerization mixture should be agitated with sufficient vigor to maintain the mixture of monomers and weighting material as droplets in the non-solvent liquid medium. Too vigorous stirring sometimes causes separation of the weighting material from the liquid monomers, presumably because the stirrer blade, on striking a droplet, imparts a greater momentum to the dense weighting material than to the less dense liquid monomers. For this reason, the rate of stirring preferably does not exceed greatly that necessary for formation of the droplets, but the rate of stirring can be varied widely. Instead of mechanically stirring the polymerization mixture, the non-solvent liquid medium can be caused to flow within a closed circuit and the mixture of monomers and weighting material be polymerized while suspended as droplets in the liquid medium flowing upward through a portion of the circuit, e. g. a polymerization column.

The combination of the above-stated steps and conditions permits production of a body of weighted beads of the copolymers, which beads do not vary greatly from one another in density, and more than 80 percent by weight of which beads fall within a narrow range of mesh sizes, e. g. from 10 to 40 mesh size. From such weighted copolymer beads, cation exchange resins and anion exchange resins may be prepared, by known reactions, in the form of weighted beads suitable for use in ion exchange processes. It has been observed that weighted ion exchange resin beads prepared in accordance with the invention have less tendency to crack during preparation and use of the same than do unweighted beads of the same ion exchange resins. The reason for this is not known.

In practice of the invention, a finely divided solid material having a density of at least 2.5 and preferably 3 or higher, and comprising particles of not larger than 80, and preferably of from 100 to 350, mesh size, is treated with a hydrophobing agent to render the same organophylic, i. e. readily wettable by polymerizable hydrocarbons such as styrene and divinylbenzene. It is desirable, but not necessary, that all of the solid material be of 80 mesh size or smaller. As hereinbefore mentioned, larger solid particles, if present, tend to separate from the monomers during the subsequent suspension polymerization operation and may be more finely ground and re-employed in the process. The requirement that the solid material used as a weighting agent have an absolute density of at least 2.5 is of practical significance. Although less dense solid materials can be employed as weighting agents in accordance with the method of the invention, it is difficult to incorporate them uniformly with the copolymers in proportions great enough to produce weighted beads having densities as high as desired. Use of finely divided weighting materials having absolute densities of 2.5 and higher permits production of uniformly weighted copolymer beads which are considerably more dense than the copolymer alone.

It is important that the weighting material be inert to the monomers, e. g. styrene and divinylbenzene, which are to be copolymerized and it is desirable, but not in all instances essential, that it be resistant to corrosion or other chemical attack by water and other chemicals, such as aqueous acids, aqueous alkalies, or aqueous salt solutions, with which the weighted ion exchange resin beads will be contacted during use in ion exchange processes. Among the finely divided solid materials which can be used as weighting agents in the process of the invention are ordinary sand, powdered silica, powdered glass, metals such as iron, nickel, chromium or molybdenum in powdered form, monazite sand, zirconium oxide and zirconium silicate. Because of its high density, its inertness to most chemicals, and its availability in large quantities, zirconium silicate is preferred. It is obtainable as a fine sand and has an absolute density of about 4.3–4.4.

A variety of hydrophobing agents suitable for use in the invention are known in the art. Examples of such agents are long chain alkylamines, such as dodecylamine, and organosilicon compounds such as dimethyl dichlorosilane, phenyltrichlorosilane, vinyltrichlorosilane, ethyltriethoxysilane, dimethylsiloxane, and methylphenylsiloxane, etc. The effectiveness of the hydrophobing agents in rendering the weighting materials organophylic varies with change in the kind of agent used and the way in which it is applied, but all such agents can be applied as thin layers on the surfaces of the finely divided weighting materials to render the latter at least temporarily organophylic. It is not necessary, in practice of the invention, that the finely divided weighting material be rendered permanently organophylic. It is sufficient that it remain wettable by the liquid monomers for the short time required to polymerize the monomers to a highly viscous, or solid, condition and any of the usual hydrophobing agents are sufficiently effective for this purpose. The hydrophobing agents may be applied by immersing the weighting material in a dilute solution thereof, removing the weighting material, and draining excess liquid therefrom, or by contacting the weighting material with vapors of a volatile hydrophobing agent, such as methyltrichlorosilane or dimethyldichlorosilane, and moist air. We preferably pass moist air through a body of the finely divided weighting material and next pass dry air first through liquid dimethyldichlorosilane and then through the body of weighting material. The thus-treated weighting material is readily wetted by vinyl aromatic compounds such as styrene and divinylbenzene.

After being treated to render it organophylic, the finely divided weighting agent, e. g. zirconium silicate, is mixed with the liquid monomers to form a mixture having an average density which is slightly less than, usually about 85 percent of, the density of the weighted copolymer beads that are to be formed. The finely divided weighting material is usually employed in amount such that its absolute volume corresponds to between 5 and 53 percent, preferably between 15 and 30 percent, of the volume of the mixture of the same and the liquid monomers, but it can be used in smaller or somewhat larger proportions, the proportion in any instance being dependent on the density of weighted copolymer beads desired.

Any mixture of a major amount by weight of one or more polymerizable monoalkenyl aromatic compounds such as styrene, alpha-methylstyrene, ar-vinyltoluene, ar-vinylxylene, or ar-ethylvinylbenzene, and a minor amount of a polyvinyl aromatic hydrocarbon, preferably divinylbenzene, can be used in making the copolymers, but such mixtures containing from 2 to 15 percent by weight of divinylbenzene are preferred. Mixtures of 80 percent by weight of styrene, and lesser amounts of ar-ethylvinylbenzene and divinylbenzene, with the latter in the proportions just stated, are usually employed.

A minor amount of a polymerization catalyst, e. g. an organic peroxide such as dibenzoyl peroxide or dilauroyl peroxide in amount corresponding to from 0.1 to 1 percent of the weight of the monomers, is usually added to increase the rate of the polymerization reaction, but a catalyst is not required.

The mixture of liquid monomers, finely divided weighting material and catalyst, if employed, is admixed with sufficient of a stable, inert, non-solvent liquid, having a viscosity of from 20 to 250, at 80° C., to serve as a medium for the suspension polymerization reaction. The resulting mixture usually contains 75 percent by volume or more of the liquid medium, but the latter can be used in somewhat smaller amounts or in as large a proportion as desired. Examples of liquids which can be used as media for the suspension polymerization reaction are glycerine, aqueous glycerine solutions having the above viscosity values, polyethylene glycols and aqueous solutions thereof having the above viscosity values, and water which has been thickened and brought to viscosities within the above range by dissolving thickening agents therein. Aqueous solutions of thickening agents are usually employed. To be suitable for the purpose, the thickening agent should be chemically stable and should not congeal from the aqueous solution at the polymerization temperature. Among the various known thickening agents that can satisfactorily be dissolved in water to form a liquid medium having the above viscosity values are glycerine, polyethylene glycol, mixtures of ethylene glycol and water-soluble methyl cellulose, and the alkali metal, e. g. sodium or potassium, salts of carboxymethyl cellulose. Methylcellulose alone is satisfactory as the thickening agent when the polymerization is carried out at temperatures of 75° C. or lower, but at higher temperatures it sometimes congeals. Sodium carboxymethylcellulose is preferably used to thicken water and render it suitable for employment as a medium for the polymerization reaction.

The mixture is heated, e. g. at polymerization temperatures of from 65° to 95° C., preferably from 80° to 90° C., while stirring or otherwise agitating the same to maintain the mixture of monomers and weighting material suspended as droplets in the liquid medium. The droplets are thereby caused to thicken, due to polymerization, and ultimately to harden. During early stages of the polymerization, collision sometimes occurs between small groups of the droplets with a result that they become stuck together as clusters, but when this occurs they usually separate on continued agitation, particularly if the vigor of stirring, or otherwise agitating the mixture, is increased. It may be mentioned that at the start of the polymerization reaction excessively rapid stirring, i. e. stirring at a rate far greater than is required for suspension of the droplets, is preferably avoided since it may cause separation of the weighting material from the monomers. However, as the droplets undergo polymerization and become more viscous, or solidified, there is far less tendency for the weighting material to separate from the droplets and the rate of stirring can be increased, or decreased, as desired. The droplets become hardened, so that they do not stick together upon contacting one another, before the polymerization is complete. Thereafter, the polymerization can be continued without stirring or otherwise agitating the mixture. However, stirring is usually continued throughout the polymerization period. The time required for the polymerization varies, depending on the polymerization temperature and whether a catalyst is used. At polymerization temperatures of from 65° to 95° C., the catalyzed suspension polymerization is usually accomplished in from 10 to 30 hours. After completing the reaction, the weighted copolymer beads are separated, e. g. by filtration or decanting, from the reaction medium.

The weighted beads from a given polymerization reaction are all of close to the same density and a major part by weight of the beads usually fall within a 60 mesh range of sizes according to the Tyler screen scale. The average size and density of the beads can be varied, from one batch to another, by changes in the kind or proportion of weighting material used, or the rate of stirring during the polymerization. In general an increase either in the proportion of a weighting agent relative to the polymerizable compounds present, or in the rate of stirring the polymerization mixture, causes a decrease in average size of the weighted copolymer beads that are formed. The weighted copolymer beads have absolute densities greater than those of the corresponding copolymers alone, e. g. the weighted copolymer beads usually have densities in the order of from 1.1 to 2.5 or higher. They are usually of between 10 and 100 mesh size.

The weighted copolymer beads can be converted into ion exchange materials by procedures similar to those heretofore employed in making cation exchange agents and anion exchange agents from unweighted granules of the copolymers. For instance, the weighted beads can be swollen slightly by contact with a liquid, such as methylene chloride or tetrachloroethylene, etc., that is a solvent for polystyrene and, while in swollen condition, can be sulfonated by treatment with usual sulfonating agents, preferably chlorosulfonic acid. When using a highly reactive sulfonating agent such as chlorosulfonic acid, the sulfonation reaction can be carried out at room temperature or thereabout, e. g. at from 0° to 50° C. With less active sulfonating agents, higher temperatures are usually required. The weighted beads of the sulfonated copolymer are insoluble in water and in aqueous solutions of acids and alkalies. They are useful as cation exchange materials.

Alternatively, the weighted copolymer beads can be chloromethylated by reaction with chloromethyl methyl ether, or other usual chloromethylating agents, and the chloromethylated beads can be reacted with ammonia or amines, such as trimethylamine, dimethylethanolamine, or ethylenediamine, etc., to introduce basic nitrogen groups into the copolymer molecule. Procedures for carrying out these reactions are well known. The resulting weighted beads of the aminated copolymers are insoluble in water and in aqueous solutions of acids and alkalies. They are useful as anion exchange agents.

The following examples describe certain ways for practice of the invention, but are not to be construed as limiting its scope.

Example 1

Air was passed at a rate of 0.25 cubic foot per minute first through a body of water at room temperature and then through a rotating tumbler which contained 50 pounds of zircon sand (i. e. zirconium silicate of about 65 percent $ZrO_2$ content) nearly all of which sand was in the form of particles of about 325 Tyler screen mesh size or smaller. The tumbler was of a usual construction, i. e. it was a vessel mounted on a horizontal axle so that it could be rotated, and was provided with an inlet and outlet for vapors and with internal baffles to cause tumbling of material inside the same. The feed of moist air to the tumbler was continued for one hour, during which time 400 ml. of water had been evaporated and passed into the tumbler. Dry air was then passed at a rate of 0.25 cubic foot per minute, first into a body of liquid dimethyldichlorosilane at room temperature and then into the rotating tumbler. The feed of the vapor mixture of air and dimethyldichlorosilane to the tumbler was continued for 1 hour. In this time, about 100 grams of dimethyldichlorosilane was vaporized and fed to the tumbler. During these operations the material in the tumbler was at room temperature or thereabouts. This treatment did not cause appreciable change in the appearance of the zircon sand, but did render it organophylic so that it could readily be wetted with styrene or other liquid vinyl aromatic compounds. The treatment apparently caused formation of thin films of dimethylsiloxane on the surfaces of the grains of zircon sand.

Example 2

To 302 grams of the zircon sand that had been rendered organophylic as described in Example 1, there were added with stirring 250 ml. of a liquid mixture of about 85.7 percent by weight styrene, 6.3 percent ar-ethylvinylbenzene, and 8 percent divinylbenzene. Approximately 1.9 grams of dibenzoylperoxide was added as a polymerization catalyst. The resulting mixture was added to a solution of 1.5 liters of glycerine and 30 ml. of water, which solution had been pre-heated to about 90° C. The mixture was stirred to break the mixture of zircon sand and the polymerizable vinyl aromatic compounds into droplets suspended in the aqueous glycerine medium. The mixture was stirred and heated at 90° C. for 3 hours, at which time the droplets appeared to have solidified. Stirring was then discontinued. However, the mixture was maintained at 90° C. for a further 15 hour period so as to assure completion of the polymerization reaction. The mixture was then filtered to separate the copolymer beads and the latter were washed with water. The weighted copolymer beads thus formed were of from 10 to 70 mesh sizes, according to the Tyler screen scale, but more than 80 percent by weight of the beads were of from 14 to 40 mesh size. The weighted copolymer beads had an average absolute density of about 1.80. They were all of close to the same density.

Example 3

A portion of the weighted copolymer beads, prepared as described in Examples 1 and 2, was sulfonated by reaction with cholorsulfonic acid in known manner. The sulfonated beads were insoluble in water and in aqueous solutions of acids or alkalies and possessed good cation exchange properties. They were screened to separate those of from 14 to 40 mesh size and these were tested to determine the rate of up-flow of an aqueous sodium chloride solution of 20 weight percent concentration through a bed of the same required to cause suspension of the beads in the solution. The rate of flow required to cause suspension of the beads, i. e. fluidizing of the bed of beads, was 0.35 foot per minute. In contrast, unweighted beads of the same sulfonated copolymer and of the same range of mesh sizes were fluidized by up-flow of a 20 weight percent aqueous sodium chloride solution through a bed of the same at a rate of only 0.07 foot per minute.

Example 4

One hundred parts by weight of copolymer beads, prepared as described in Examples 1 and 2, are immersed in 150 parts of chloromethyl methyl ether. Thirty parts of powdered zinc chloride is added and the mixture is stirred and maintained at 20°–25° C. for 8 hours. The beads are then removed from the reaction liquor and washed successively with acetone and water. The weighted chloromethylated copolymer beads thus obtained are immersed in more than their chemical equivalent of an aqueous trimethylamine solution of from 25 to 30 weight percent concentration and the mixture is heated at temperatures of from 70° to 85° C. for 4 hours, whereby weighted beads of the corresponding quaternary ammonium salt of the copolymer are formed. These weighted beads are useful as an anion exchange material. They can be converted to their basic form by treatment with a dilute, e. g. one-normal, aqueous sodium hydroxide solution. They are insoluble in water and in aqueous solutions of acids, salts and alkalies.

Example 5

In each of a series of experiments, zircon sand of about 325 mesh particle size or smaller was immersed in a dilute solution of a known hydrophobing agent in an organic solvent, removed from the solution by filtration, and permitted to stand exposed to air and drain free of the liquid so as to leave thin films of the hydrophobing agent on the grains of the zircon sand. A different kind of hydrophobing agent was used in each experiment. The thus treated sand was tested, as in Example 2, to determine whether, upon admixing it with a liquid mixture of styrene, ar-ethylvinylbenzene, and divinylbenzene and suspension polymerizing the mixture by stirring it together with glycerine as a medium, the zircon sand would be retained together with the vinyl aromatic compounds being polymerized. In all instances there were produced weighted copolymer granules having the zircon sand embedded therein, i. e. each of the treatments with a wetting agent was effective in rendering the zircon and organophylic so that it was wetted by the liquid vinyl aromatic compounds. The hydrophobing agents which were tested are ethyltriethoxysilane, phenyltrichlorosilane, vinyltrichlorosilane, and n-octadecylamine.

Example 6

The procedure of Example 2 was repeated except that an aqueous one weight percent solution of the sodium salt of carboxymethyl cellulose, instead of aqueous glycerine, was used as the medium for the suspension polymerization reaction. The results were similar to those reported in Example 2, i. e. there were obtained weighted beads of the copolymer of styrene, ar-ethylvinylbenzene and divinylbenzene, which beads were of substantially uniform density and had zircon sand embedded therein.

Example 7

A series of experiments were carried out, as described in Examples 1 and 2, except that, in place of the zircon sand, different kinds of weight agents were used in the respective experiments. Each finely divided weighting agent, in the form of particles of from 100 to 350 mesh size, was treated with moist air and then with a vapor mixture of dry air and dimethyldichlorosilane, as described in Example 1. It was then stirred together with the liquid mixture of styrene, ar-ethylvinylbenzene and styrene. A minor amount of dibenzoyl peroxide was added as a polymerization catalyst and the resulting mixture was stirred together with aqueous glycerine to form a suspension of droplets of the same in the glycerine while heating the mixture at temperatures between 65° and 95° C., as described in Example 2. The weighting agents which were used in the respective experiments are silicon carbide, powdered glass, and monazite sand. In each experiment there was obtained weighted beads of the copolymer of styrene, ar-ethylvinylbenzene and divinylbenzene, which beads were of a substantially uniform density considerably greater than that of the copolymer alone and contained the weighting agent embedded therein.

We claim:

1. Rounded granules of: (1) an ion exchange resin which is a derivative of a copolymer, of a major proportion by weight of at least one alkenyl aromatic hydrocarbon having an alkenyl radical selected from the group consisting of vinyl and isopropenyl radicals attached to a carbon atom of the aromatic nucleus and a minor amount of divinylbenzene, having ion exchange radicals present as substituents on the copolymer molecule, and (2) a finely divided solid material having a density of at least 2.5, which material is incompatible with the solid polymeric material and is embedded in the latter in a proportion larger than 5 percent of the combined absolute volume of the same and said polymeric material and such that the granules have a density greater than that of the polymeric material alone.

2. Rounded granules, as described in claim 1, wherein the ion exchange resin is one derived from a copolymer of styrene, ar-ethylvinylbenzene and divinylbenzene by the introduction of ion exchange radicals into the copolymer molecule.

3. Rounded granules, as described in claim 1, wherein the ion exchange resin is a sulfonated copolymer of a major proportion by weight of at least one alkenyl aromatic hydrocarbon having an alkenyl radical of the group consisting of vinyl and isopropenyl radicals attached to a carbon atom of the aromatic nucleus and a minor proportion of divinylbenzene, which sulfonated copolymer is insoluble in water and in aqueous solutions of acids, salts and alkalies and is effective as a cation exchange agent.

4. Rounded granules, as described in claim 1, wherein the ion exchange resin is a water-insoluble sulfonated copolymer of styrene, ar-ethylvinylbenzene and from 2 to 15 percent by weight of divinylbenzene.

5. Rounded granules, as described in claim 1, wherein the ion exchange resin is a water-insoluble sulfonated copolymer of styrene, ar-ethylvinylbenzene and from 2 to 15 percent by weight of divinylbenzene and the incompatible finely divided solid material, having a density of at least 2.5, that is embedded therein consists for the most part of zirconium silicate.

6. Rounded granules, as described in claim 1, wherein the ion exchange resin is an anion exchange resin.

7. Rounded granules, as described in claim 1, wherein the ion exchange resin is an anion exchange resin formed by chloromethylating a copolymer of styrene, ar-ethylvinylbenzene and from 2 to 15 percent of divinylbenzene and reacting the chloromethylated copolymer with a basic nitrogen compound of the class consisting of ammonia and amines.

8. Rounded granules, as described in claim 1, wherein the ion exchange resin is an anion exchange resin formed by chloromethylating a copolymer of styrene, ar-ethylvinylbenzene and from 2 to 15 weight percent of divinylbenzene and reacting the chloromethylated copolymer with trimethylamine and the finely divided solid material having a density of at least 3 which is embedded in the polymeric material consists for the most part of zirconium silicate.

9. A method which comprises treating a finely divided solid material, which has an absolute density of at least 2.5 and is of not larger than 80 mesh particle size and which is water-wettable and is insoluble in and chemically inert to vinyl aromatic compounds and their polymers, with an agent which, when applied as a thin film on a water-wettable solid material, renders the treated material repellant to water and wettable by organic liquids, admixing from 5 to 53 parts by volume of the thus-treated solid material with from 47 to 95 parts of a mixture of a major proportion by weight of at least one monoalkenyl aromatic hydrocarbon having an alkenylradical of the group consisting of vinyl and isopropenyl radicals attached to the aromatic nucleus and a minor proportion of divinylbenzene, agitating the resulting mixture together with a larger volume of a non-solvent liquid having a viscosity of from 20 to 250 centipoises at 80° C. to form a suspension of droplets of the last mentioned mixture in the non-solvent liquid while heating the agitated mixture to cause solidification of the droplets, whereby weighted copolymer granules having the finely divided solid material embedded therein are formed, and thereafter chemically treating the weighted granules to introduce ion exchange radicals into the copolymer molecule and thus form weighted granules of an ion exchange resin.

10. A method, as claimed in claim 9, wherein the finely divided solid starting material has an absolute density at least as high as 3.

11. A method, as claimed in claim 9, wherein the agent applied to the finely divided solid starting material is dimethyldichlorosilane.

12. A method, as claimed in claim 9, wherein the weighted granules are chemically treated to introduce ion exchange radicals into the copolymer molecule and weighted, substantially spherical granules of an ion exchange resin are thus formed.

13. A method, as claimed in claim 9, wherein the weighted copolymer granules are sulfonated and weighted, substantially spherical granules of a cation exchange resin are thus formed.

14. A method, as claimed in claim 9, wherein the weighted copolymer granules are chloromethylated and the chloromethylated granules are reacted with a basic nitrogen compound of the group consisting of ammonia and amines, whereby substantially spherical weighted granules of an anion exchange resin are formed.

15. A method, as claimed in claim 9, wherein the finely divided solid material consists for the most part of zirconium silicate, the polymerizable starting material is a mixture of styrene, ar-ethylvinylbenzene and from 2 to 15 percent by weight of divinylbenzene, and the weighted copolymer granules which are formed consist essentially of a copolymer of the polymerizable starting materials having the zirconium silicate embedded therein.

16. A method, as claimed in claim 15, wherein the weighted copolymer granules are chemically treated to introduce ion exchange radicals into the copolymer molecule and weighted, substantially spherical granules of an ion exchange resin are thus formed.

17. A method, as claimed in claim 15, wherein the weighted copolymer granules are sulfonated and weighted, substantially spherical granules of a cation exchange resin are thus formed.

18. A method, as claimed in claim 15, wherein the weighted copolymer granules are chloromethylated and the chloromethylated granules are reacted with a basic nitrogen compound of the group consisting of ammonia and amines, whereby substantially spherical weighted granules of an anion exchange resin are formed.

References Cited in the file of this patent

UNITED STATES PATENTS

| | | |
|---|---|---|
| 2,204,743 | Yngve | June 18, 1940 |
| 2,277,393 | Depew | Mar. 24, 1942 |
| 2,366,007 | D'Alelio | Dec. 26, 1944 |
| 2,366,008 | D'Alelio | Dec. 26, 1944 |
| 2,436,304 | Johannson | Feb. 17, 1948 |
| 2,510,661 | Safford | June 6, 1950 |
| 2,524,627 | Hohenstein | Oct. 3, 1950 |
| 2,589,705 | Kistler | Mar. 18, 1952 |
| 2,591,574 | McBurney | Apr. 1, 1952 |
| 2,593,417 | D'Alelio | Apr. 22, 1952 |
| 2,594,913 | Grim | Apr. 29, 1952 |
| 2,631,127 | D'Alelio | Mar. 10, 1953 |
| 2,668,806 | Haward et al. | Feb. 9, 1954 |

OTHER REFERENCES

Mattiello: Protective and Decorative Coatings, vol. IV, Wiley, 1944, page 63.